US012559015B2

(12) United States Patent
Zuniga et al.

(10) Patent No.: US 12,559,015 B2
(45) Date of Patent: Feb. 24, 2026

(54) MODULAR CONTAINER DELIVERY SYSTEM

(71) Applicant: Ford Global Technologies, LLC, Dearborn, MI (US)

(72) Inventors: Pablo Gabino Zuniga, Iztapalapa (MX); Jose Luis Toriz Vega, Metepec (MX); Diego Lopez Lerma, Toluca (MX)

(*) Notice: Subject to any disclaimer, the term of this patent is extended or adjusted under 35 U.S.C. 154(b) by 279 days.

(21) Appl. No.: 18/333,539

(22) Filed: Jun. 13, 2023

(65) Prior Publication Data

US 2024/0416819 A1 Dec. 19, 2024

(51) Int. Cl.
B60P 1/64 (2006.01)
B60P 1/54 (2006.01)
B60P 3/00 (2006.01)
G06Q 10/0833 (2023.01)

(52) U.S. Cl.
CPC .......... B60P 1/6409 (2013.01); B60P 1/5471 (2013.01); B60P 1/6418 (2013.01); B60P 3/007 (2013.01); G06Q 10/0833 (2013.01)

(58) Field of Classification Search
None
See application file for complete search history.

(56) References Cited

U.S. PATENT DOCUMENTS

| | | | |
|---|---|---|---|
| 9,256,852 B1 | 2/2016 | Myllymaki | |
| 10,351,347 B2 | 7/2019 | Luckay et al. | |
| 11,200,531 B1* | 12/2021 | Brady | B65G 47/901 |

| | | | |
|---|---|---|---|
| 2015/0321595 A1* | 11/2015 | Hempsch | G06Q 10/083 |
| | | | 414/812 |
| 2018/0024554 A1* | 1/2018 | Brady | G06Q 10/0833 |
| | | | 701/23 |
| 2019/0279181 A1* | 9/2019 | Kelly | G07F 9/023 |
| 2020/0207250 A1* | 7/2020 | Jarvis | G01C 21/3623 |
| 2020/0385207 A1* | 12/2020 | Godwin | B60P 3/007 |
| 2021/0387808 A1* | 12/2021 | Kalouche | B60P 3/007 |
| 2022/0180299 A1* | 6/2022 | Väin | B65G 1/1371 |
| 2023/0237424 A1* | 7/2023 | Moynihan | G06Q 10/08 |
| | | | 705/333 |

FOREIGN PATENT DOCUMENTS

CN 209241888 U 8/2019

OTHER PUBLICATIONS

Ostermeier M, Heimfarth A, and Hübner A, "Cost-optimal truck-and-robot routing for last-mile delivery," Apr. 2022, Networks: An International Journal, vol. 79, Issue 3, pp. 364-389. (Year: 2022).*
Office of Inspector General United States Postal Services, Autonomous Vehicles for the Postal Service, Oct. 2, 2007.

* cited by examiner

*Primary Examiner* — Christopher Gomez
(74) *Attorney, Agent, or Firm* — Emily Drake; Eversheds Sutherland (US) LLP

(57) ABSTRACT

Modular container delivery systems and methods are described herein. A modular container delivery system may be implemented to facilitate autonomous delivery of packages to customers. A modular container, as described in greater detail below, may be attached to a battery operated electric vehicle (BEV) and autonomous driving platform chassis. The container system itself contains a package sorting mechanism that is configured to move packages inside the vehicle, organize them into separate section of the vehicle and retrieve packages for delivery on as needed.

7 Claims, 8 Drawing Sheets

100

600

Crane
602

Box Unit
604

Electronic
Comms
608

Magnetic
Pick
606

Box Charging /
Box Comms
610

700

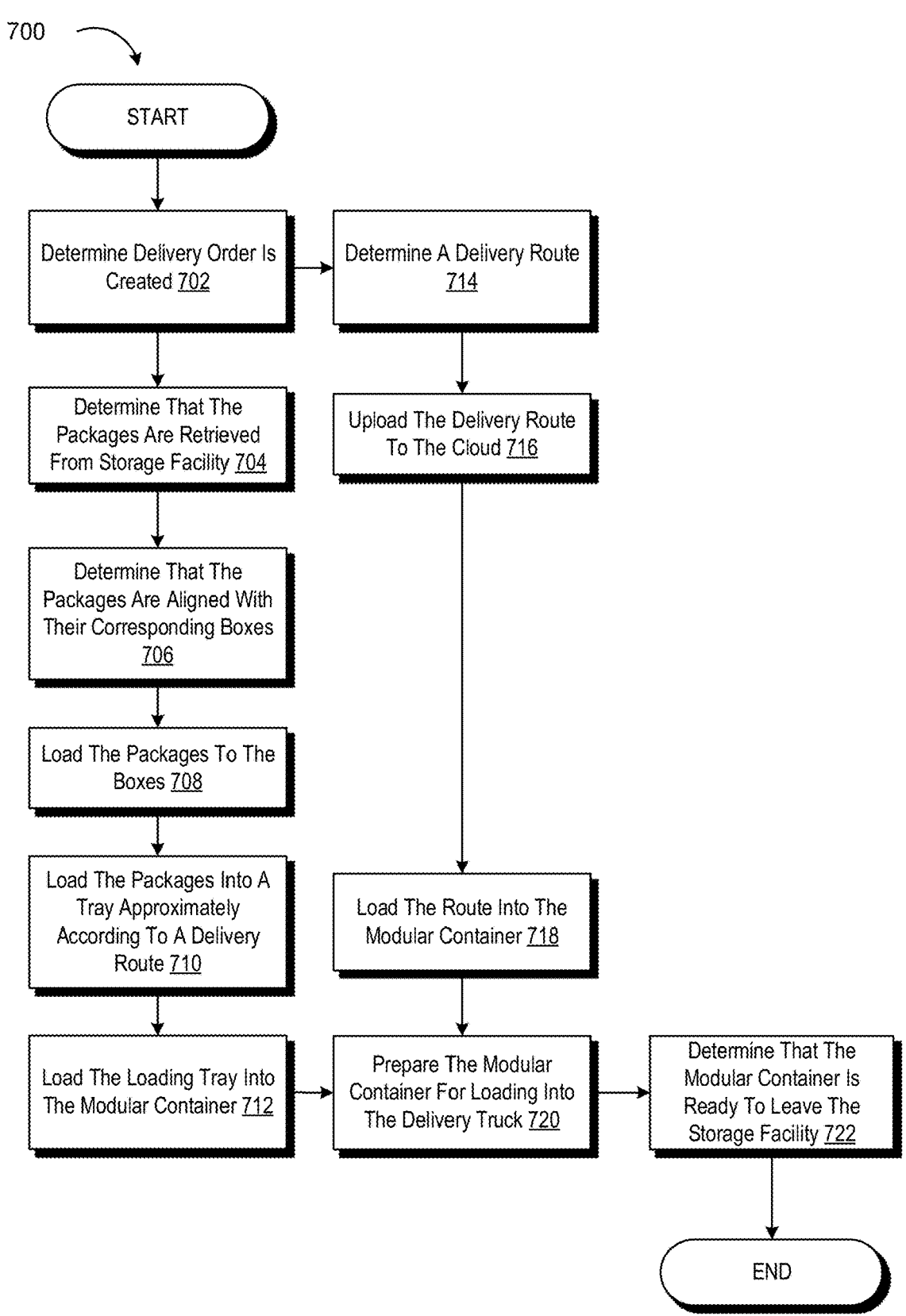

START

Determine Delivery Order Is Created 702

Determine A Delivery Route 714

Determine That The Packages Are Retrieved From Storage Facility 704

Upload The Delivery Route To The Cloud 716

Determine That The Packages Are Aligned With Their Corresponding Boxes 706

Load The Packages To The Boxes 708

Load The Packages Into A Tray Approximately According To A Delivery Route 710

Load The Route Into The Modular Container 718

Load The Loading Tray Into The Modular Container 712

Prepare The Modular Container For Loading Into The Delivery Truck 720

Determine That The Modular Container Is Ready To Leave The Storage Facility 722

END

FIG. 7

MODULAR CONTAINER DELIVERY SYSTEM

BACKGROUND

Delivering packages is a complex process that involves a number of challenges. Shipping and transportation expenses can be high, which can include expenditures for gas or electricity, human resources (e.g., truck drivers and/or storage facility workers), and others. Another challenge is logistics, as coordinating the movement of packages through various stages of the delivery process can be difficult, especially when dealing with a large volume of packages. Additionally, the possibility of disease transmission have become a significant concern in recent years, as the COVID-19 pandemic has highlighted the potential for disease to spread through person-to-person contact, which can occur during package handling and/or delivery.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 7 shows an illustrative example of a process for preparing a modular container for delivery, in accordance with one or more example embodiments of the present disclosure.

DETAILED DESCRIPTION

Overview

Figure 1:
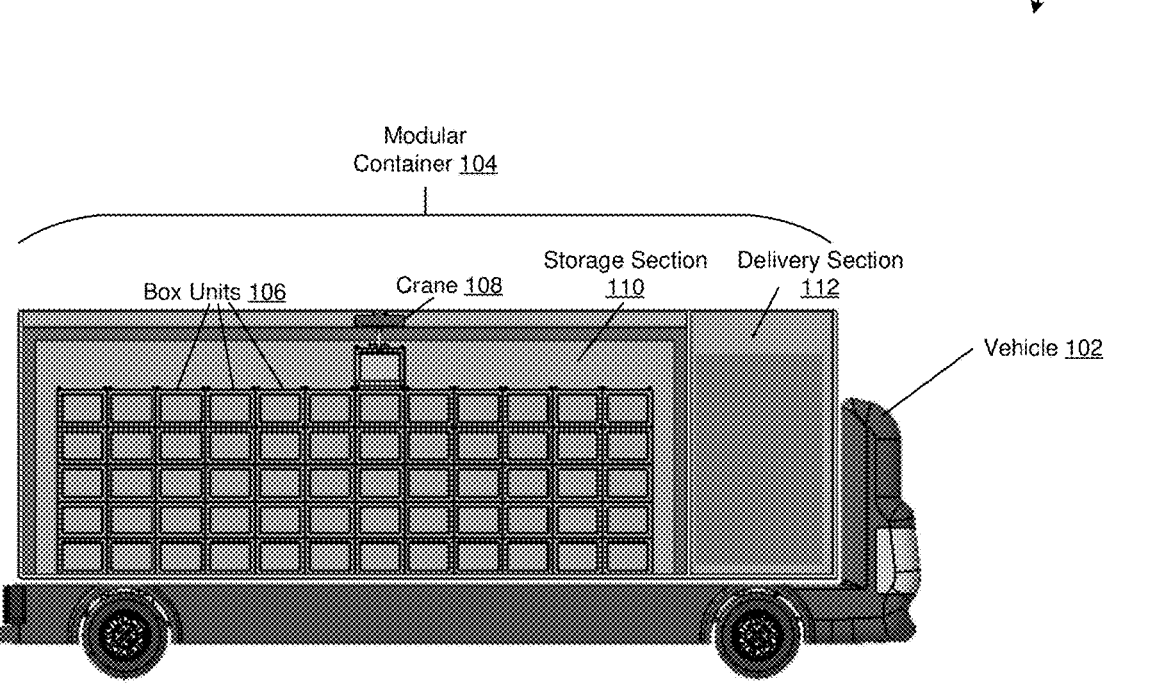
FIG. 1 depicts an illustrative, non-limiting example diagram of a vehicle with modular containers, according to at least one embodiment of the present disclosure.

The present disclosure is directed to modular contain delivery systems and methods.

According to at least one embodiment, a modular container system may be implemented to facilitate autonomous delivery of packages to customers. A modular container, as described in greater detail below, may be attached to a battery operated electric vehicle (BEV) and autonomous driving platform chassis. The container system itself contains a package sorting mechanism that is configured to move packages inside the vehicle, organize them into separate section of the vehicle where customers do not have access to rest of the packages, and retrieve packages when delivery is needed. In this way, customers can have a fully automated delivery experience where there is no need to have additional personnel for the delivery of the packages.

Modular containers have many benefits over existing solutions. For example, modular containers can be quickly changed in a storage facility to send the vehicle in to another run of deliveries, and in the meanwhile, the emptied modular container can be quickly processed for maintenance, battery charging, or to load new packages.

In at least one embodiment, a modular container delivery system comprises a modular container that is attachable to a vehicle via a special connection interface that provides for mechanical engagement and module communication. The vehicle and modular container may be attached to facilitate delivery of packages that are stored in the modular container. The modular container may be loaded with a plurality of box units and comprise a magnetic arm with an attachment mechanism for attaching to the box units. Box units may have one or more magnetic picks that the magnetic arm can attach to.

In various embodiments, a process for contactless delivery of packages using a modular container delivery system comprises determining, based on a delivery route, at least a first package in a first box unit that is ready for delivery; confirming delivery of the first package with a client; using the magnetic arm to arrange the first box unit for pickup; reading a QR code to verify the first package; performing a package-client verification; determining successful verification of the client; determining that the client has arrived at a delivery location; determining that the client has extracted the first package from the first box unit; and updating first package status of the first package to delivered.

In various embodiments, the process further comprises determining an incorrect client as part of the package-client verification; moving the first package to a delayed delivery section of the modular container; and updating the first package status to request attention.

In various embodiments, the process further comprises determining the client is unable to receive the first package as part of the package-client verification; updating the first package status to retry delivery; and rescheduling delivery of the first package.

In various embodiments, the process further comprises using the magnetic arm to move the first box unit from a storage section of the modular container to a delivery section of the modular container.

In various embodiments, the first box unit comprises: a first notification LED that reflects the first package status; a first magnetic pick for attachment with the magnetic arm; and first electronic comms. In various embodiments, the first box unit further comprises a second magnetic pick located on a bottom of the first box unit for attachment with another box unit.

In various embodiments, the modular container comprises a verification unit for reading the QR code and a delivery interface for providing the client with access to the first package.

In various embodiments, a modular container delivery system, refers to a system for performing contactless delivery of packages to customers. The modular contact delivery system may refer to a modular container that is attached to a vehicle via a special connection interface for mechanical engagement and module communication with a modular container. The modular container may comprise: a frame; a sliding member attached to the frame, the sliding member further comprising a crossbar; and a crane attached to the sliding members, the crane further comprising an attachment mechanism for engaging box units. The modular container may store a plurality of box units, wherein each box unit comprises: a notification LED; a magnetic pick; and electronic comms.

In various embodiments, the modular container comprises a storage section and a delivery section.

In various embodiments, the modular container further comprises a verification unit that is configured to: perform a client-package verification based on information provided by a client; provide the client with access to a package within a box unit of the plurality of box units; determine that the client has extracted the package; and update status of the package as being delivered. The information may be a QR code, PIN, passcode, etc.

In various embodiments, the plurality of box units each communicate their respective package status to the modular container using the electronic comms. In various embodiments, a first box unit located above a second box unit relays package status information to the modular container via the second box unit.

In various embodiments, the plurality of boxes are organized by the crane approximately according to a delivery route.

In various embodiments, a method for preparing a modular container delivery system for dispatch from a storage facility comprises: determining that a delivery order is created; determining a plurality of packages have been retrieved; determining that the plurality of packages are aligned with a corresponding plurality of box units; loading each of the plurality of packages to a respective box unit of the plurality of box units; loading the plurality of box units into a modular container; determining a delivery route; loading the delivery route to the modular container; attaching the modular container to a vehicle; and determining that the vehicle is ready to follow the delivery route.

In various embodiments, the plurality of box units are loaded into the modular container approximately according to the delivery route.

In various embodiments, the method further comprises uploading the delivery route to a cloud service.

In various embodiments, the modular container is a power source for the vehicle.

In various embodiments, the plurality of boxes are loaded into a storage section of the modular container that is separate from a delivery section of the modular container.

FIG. 1 depicts an illustrative, non-limiting example diagram 100 of a vehicle 102 with modular containers, according to at least one embodiment of the present disclosure.

Vehicle 102 depicted in FIG. 1 may be any suitable type of vehicle for performing deliveries. Packages may be loaded into box units 106, and the box units 106 may be loaded into a modular container 104. The modular container 104 may have a crane 108 that can be used to load and unload the box units, for example, via a magnetic attachment element. Modular container 104 may comprise a storage section 110 and a delivery section 112. Storage section 110 may be used for storage of packages in an area that is generally inaccessible to customers. For example, there may be a wall or other physical barrier that prevents access to box units that are in the storage section 110. Delivery section 112 may comprise a package delivery interface that can be used by customers to access packages. In various embodiments, the modular container 104 can be attached to or detached from a platform chassis 114 of vehicle 102.

As an example, an autonomous delivery may facilitate touchless package deliveries. Benefits of such a delivery system may include, among others, cleanliness. With the growing concern of highly contagious diseases such as COVID-19, the ability to deliver packages in a touchless manner helps to mitigate or eliminate potential transmission between a delivery worker and a package recipient.

It should be understood that the vehicle configuration described herein is merely exemplary and is not intended to be limited. Other electric or hybrid vehicle configurations should be construed as disclosed herein. Other vehicle configurations may include, but are not limited to, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other electric or hybrid vehicle configuration known to a person of ordinary skill in the art.

In various embodiments, the modular container and the driving platform have a special connection interface for both mechanical engagement and module communication. The modular container delivers extra information for the vehicle platform, such as extra cameras and sensors. In various embodiments, the modular containers can charge the driving platform so that the platform has less charging downtime and more workable hours.

In various embodiments, a modular container system is attached to a vehicle and the vehicle is assigned a delivery route based on the contents of the modular container system. For example, the modular container may be loaded with box units that are organized based on a delivery route. The delivery route may be an approximate delivery route that may be modified based on last-minute deliveries. Box units that are loaded into a modular container may have electrical circuitry that stores information regarding the contents of the box, such as package information, delivery location information, etc. In various embodiments, a cloud service determines a delivery route and provides the delivery route to the vehicle. In various embodiments, the vehicle may be dispatched to perform a delivery route. After the vehicle is in its delivery route, any route obstructions, deviations, or route changes may be handled by the vehicle's onboard control units and geolocation systems. For example, the vehicle's system may be notified of a route change and the vehicle system may confirm the change and update its pathing to track the new route.

A route change may be processed by the vehicle's control unit to improve delivery times. If the vehicle changes the route to improve delivery times, box units that would be delayed will be placed in a pending state, according to at least one embodiment. In various embodiments, in case the vehicle cannot deliver in a section of the route on time, the box units can be easily identified on the storage facility and placed for a future delivery run.

In various embodiments, customers can assign another person as its delivery backup. If this is done, the vehicle can make the adjustments needed while in service to deliver that package to the backup if the backup is also in the vehicle's planned delivery route.

The status of box units may be reflected by a visual indicator, for example, the box unit may comprise a notification LED that will emit a specific color to reflect the state. For example, the notification LED may be off or blank when a package has been successfully delivered, the LED may be blue when the package is pending status, red when there is an error, green when it is ready for transport, yellow if the box unit is in need of service. These should be considered non-limiting examples of how status can be communicated to individuals in the delivery workflow.

In various embodiments, if a package is not delivered, such status may be reflected by a blue LED and the system may arrange a new delivery date with the client. If this also fails, the delivery may be canceled or placed in a local delivery locker so that the client can go to a physical location to pick up his/her package.

For the package loading in the vehicle, after the delivery orders are made, they are sorted depending on their locale, or according to a predetermined route, or any other suitable manner for delivery route determination. Packages may be sorted approximately according to their intended route. Approximate delivery routes may differ from the actual delivery route that is eventually traversed for the delivery. This may be due to changes in the delivery that are caused by processing of last-minute packages. For example, the bulk of packages may be sorted and loaded throughout the day or at some time prior to when the delivery vehicle is to be dispatched on the delivery route. However, at some point after which packages are loaded and prior to dispatch, additional packages may arrive at the facility and loaded to the modular container. This may result in a situation where the last-minute package would have been placed in a different location within the modular container had it been received earlier.

After all boxes for a route are loaded into a storage container, the box unit may communicate its delivery location with the container through the box unit's communication systems, so that the system can identify the location of each package on each stack of packages and perform rearrangement of the package boxes depending on their delivery proximity to the client.

Figure 2:
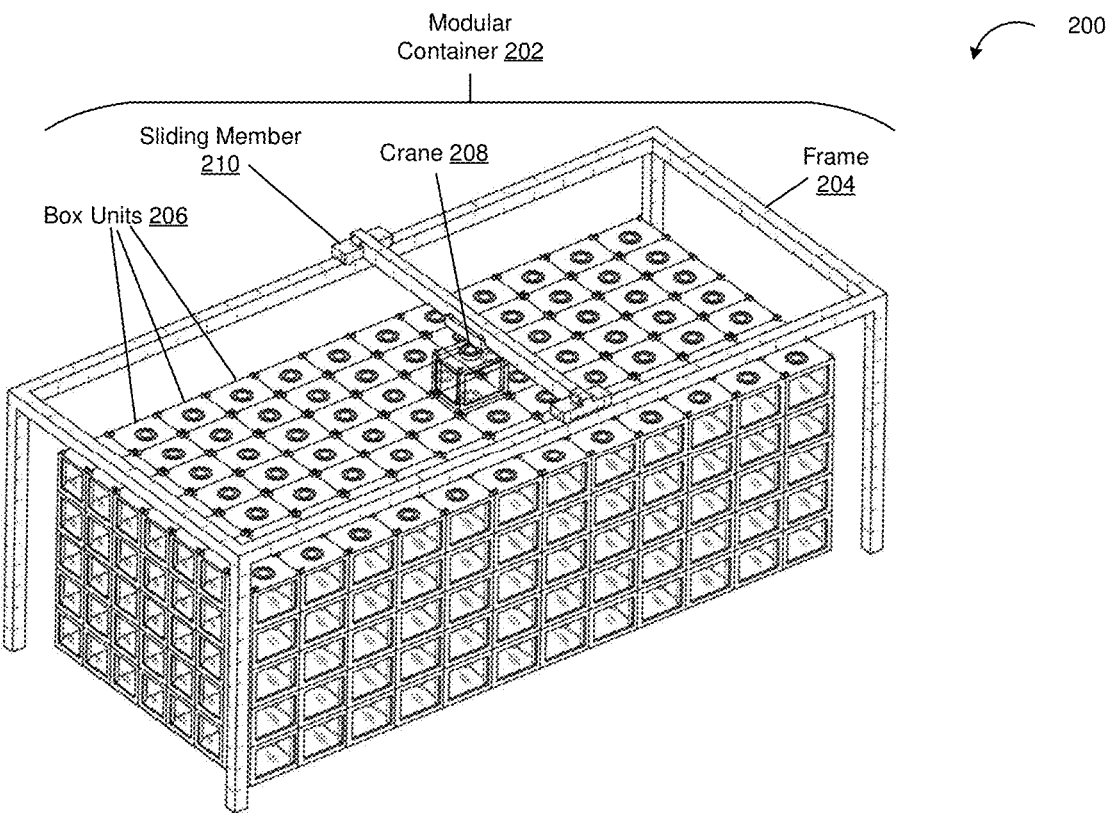
FIG. 2 depicts an illustrative, non-limiting example diagram of a modular container, according to at least one embodiment of the present disclosure.

FIG. 2 depicts an illustrative, non-limiting example diagram 200 of a modular container 202, according to at least one embodiment of the present disclosure.

In various embodiments, a simplified diagram of a modular container 202 is depicted in FIG. 2. Modular container 202 may comprise a frame 204 which is used to house box units 206. Box units 206 may be of various sizes and shapes, although a single, uniform cube-shaped box unit is depicted in FIG. 2 for simplicity. In various embodiments, the box units have magnetic attachment elements that may be used by crane 208 for attachment and detachment.

Frame 204 may have a sliding member 210 comprising a crossbar that holds crane 208. For example, the sliding member 210 may move along a horizontal axis and the crossbar may move along a vertical axis. The crane 208 may be configurable to raise or lower. Accordingly, it should be appreciated that crane 208 can be configured to access any of the box units 206 illustrated in FIG. 2. For example, crane 208 may move along sliding member 210 in order and/or the crossbar to load box units into a modular container. In various embodiments, the box units are different shapes (e.g., different heights, widths, and/or lengths).

While not depicted in FIG. 2 so as to not obscure the internal elements of the modular container, walls may be situated along the sides of the modular container 202. In various embodiments, the modular container has an attachment mechanism or connection interface for mechanical engagement and/or module communication. The modular container delivers extra information for the vehicle platform, such as extra cameras and sensors. In various embodiments, the modular containers can charge the driving platform so that the platform has less charging downtime and more workable hours.

Figure 3:
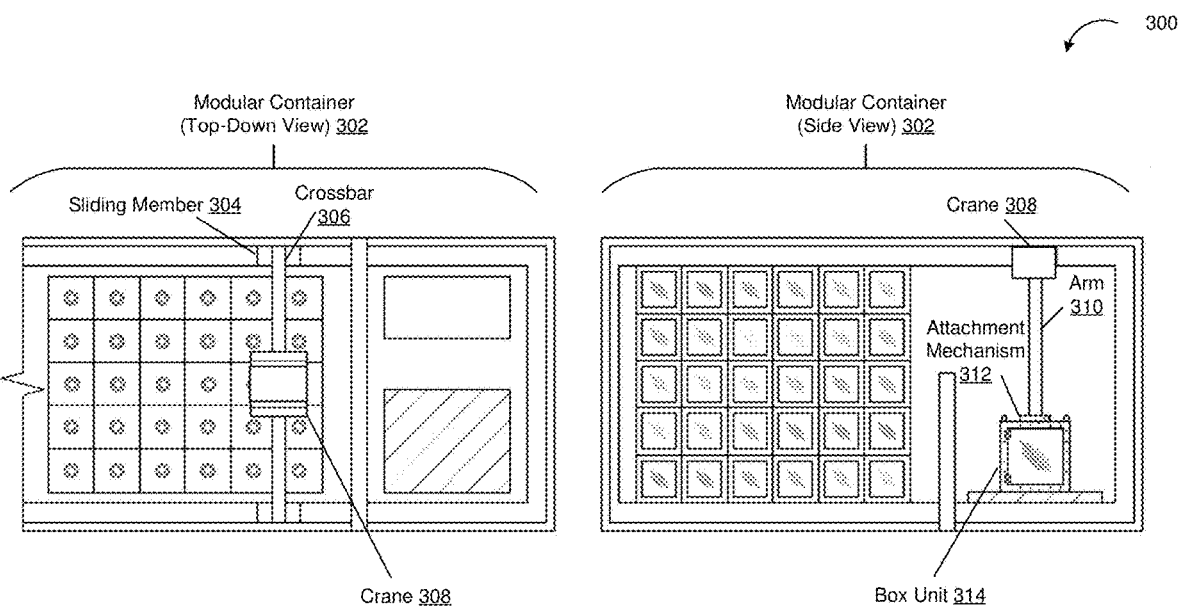
FIG. 3 depicts an illustrative, non-limiting example diagram of the interior of a modular container, according to at least one embodiment of the present disclosure.

FIG. 3 depicts an illustrative, non-limiting example diagram 300 of the interior of a modular container 302, according to at least one embodiment of the present disclosure.

In various embodiments, the modular container 302 of FIG. 3 is depicted on the left-hand portion from a top-down view and on the right-hand portion from a side view.

In various embodiments, the modular container 302 comprises a sliding member 304 that may be able to slide along railing of the modular container 302 to move to the front and back of the modular container. The crossbar 306 may be used to position the crane 308 towards the left or right side of the modular container. Accordingly, it should be appreciated that the crane 308 can be controlled to be placed above box units that may be stored throughout the modular container. In various embodiments, the box units depicted in FIG. 3 are stored in a storage section while in transit and then moved to a delivery section to allow for authorized clients to receive their packages.

Turning now to the right-hand portion of FIG. 3, the crane 308 may receive electrical commands to retrieve a box unit (e.g., box unit 314) from the storage section of the modular container 302. The crane 308 may be positioned by moving along the sliding member 304 and/or crossbar 306 so that it is located directly above the desired box unit. Crane 308 may comprise an arm 310 that is extendable and retractable. The arm may be extended so that it touches the desired box unit and an attachment mechanism 312 located at or near the end of the arm 310 touches and/or engages the desired box unit. Box units may have a magnetic attachment member that can be used by the crane 308 for a secure attachment. The box unit 314 may be retrieved and then moved to a delivery portion of the modular container 302 and then the attachment mechanism may be disengaged once it has been placed in the delivery section of the modular container. This facilitates the delivery of the contents of the box unit 314 (e.g., a package) to a client or customer.

Figure 4:
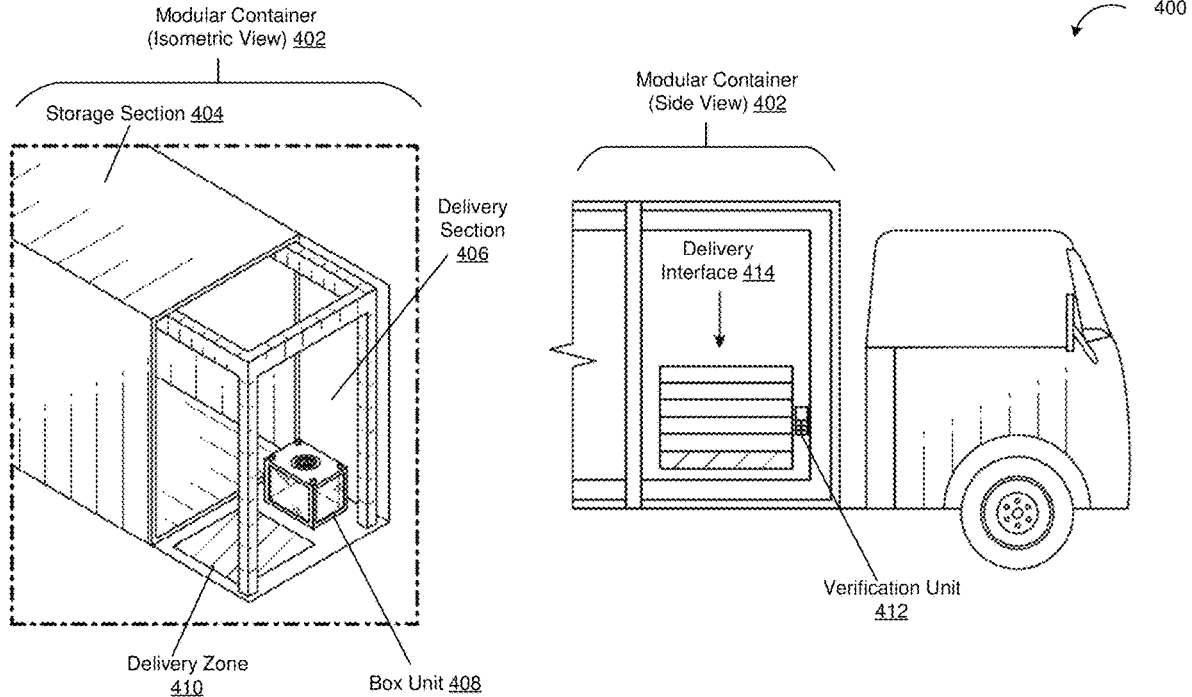
FIG. 4 depicts an illustrative, non-limiting example diagram of delivery aspects of a modular container, according to at least one embodiment of the present disclosure.

FIG. 4 depicts an illustrative, non-limiting example diagram 400 of delivery aspects of a modular container 402, according to at least one embodiment of the present disclosure.

The left-hand portion of FIG. 4 depicts an isometric view of a modular container 402, according to at least one embodiment of the present disclosure. In various embodiments, the modular container 402 is organized into at least a storage section 404 and a delivery section 406. Storage section 404 may be used for storage of packages in an area that is generally inaccessible to customers. For example, there may be a wall or other physical barrier that prevents access to box units that are in the storage section 404. Delivery section 406 may comprise a package delivery interface that can be used by customers to access packages in box units (e.g., box unit 408) via delivery zone 410. In various embodiments, modular container 402 comprises a delayed delivery section (not shown in FIG. 4) that may be utilized in connection with the processes described in FIG. 8.

Returning to FIG. 4, when a package is to be delivered, a crane may determine the box unit that has the package to be delivered and retrieve the box unit from the storage section 404 of the modular container 402. The box unit 408 that is retrieved may be moved from the storage section 404 to the delivery section 406. The box unit 408 may be placed in the delivery section 406 but not at the delivery zone 410 until the customer uses a verification unit 412 to perform a verification step, such as to enter a QR code, PIN, or passcode correctly. In various embodiments, delivery interface 414 includes a door, hatch, or other moveable element that will expose the box unit 408 to the customer. For example, when the customer enters a QR code for box unit 408, the box unit may be moved to the delivery zone 410 and a door of the box unit 408 may be unlocked (e.g., via an electronic command sent to the box unit 408). The delivery interface 414 may be smaller than the frame of the box unit 408 so that the door of the box unit can be opened but the box unit itself cannot be removed via delivery interface 414.

Figure 5:
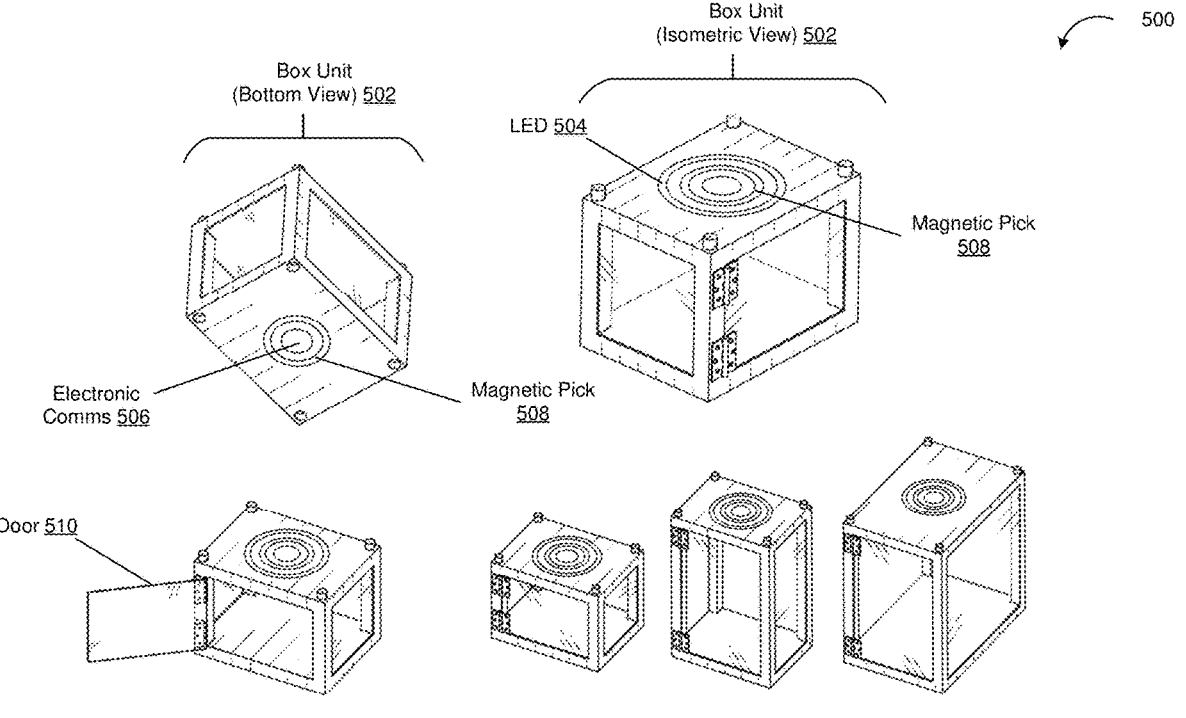
FIG. 5 depicts an illustrative, non-limiting example diagram of a variety of box units, according to at least one embodiment of the present disclosure.

FIG. 5 depicts an illustrative, non-limiting example diagram 500 of a variety of box units, according to at least one embodiment of the present disclosure.

Various box units, such as box unit 502 are illustrated in FIG. 5. A box unit may comprise various components, such as a LED 504 or other visual indicator element, electronic comms 506, and magnetic pick 508. In various embodiments, LED 504 is a visual indicator located on the top of the box unit that provides workers with an easy to see and easy to understand visual indicator of the status of the box unit 502. LED 504 will emit a specific color to reflect the state of the box unit. For example, the notification LED may be off or blank when a package has been successfully delivered, the LED may be blue when the package is pending status, red when there is an error, green when it is ready for transport, yellow if the box unit is in need of service. These should be considered non-limiting examples of how status can be communicated to individuals in the delivery workflow.

In various embodiments, electronic comms 506 refers to a module communication mechanism that can be used to relay information to other components within the delivery ecosystem. For example, electronic comms 506 may be in attachment with a receiving member on the bottom of a modular container. The box unit 502 may communicate its contents, delivery location, delivery time, and other information that may be used as part of the delivery workflow. In various embodiments, the box unit relays delivery information from other box units. For example, a first box unit located beneath a second box unit may be used to communicate to the modular container delivery information of the second box unit in a relay mechanism. Information regarding the location of the box units (e.g., how many units high it is) may be provided to the modular container, thereby providing the modular container with a 3-dimensional view of the location of all box units within the modular container.

In various embodiments, magnetic pick 508 may be used for attachment and/or disengagement of box units with each other and/or with a modular container. For example, the magnetic pick 508 located on the bottom of a box unit 502 may be attached to a receiving member located on the bottom of the modular container. As a second example, the bottom magnetic pick of a first box unit may be attached to the top magnetic pick of a second box unit, thereby securely stacking the first box unit on top of the second box unit.

In various embodiments, the box unit 502 comprises a door 510 that can be locked or unlocked. The door may be locked after a package is placed within the box unit 502 to prevent theft or tampering. When a customer enters validation information, the door 510 may be unlocked to provide the customer with access to the package that is being delivered.

In various embodiments, box unit 502 comprises a battery or other energy storage mechanism. The electronic comms or other components may be used to deliver battery power from the box units to each other or to the modular container. The modular container may provide power to the vehicle via a special interface. The modular container may provide power to a battery or hybrid vehicle, either as a primary or supplemental power source.

Figure 6:
FIG. 6 depicts an illustrative, non-limiting example diagram of a box unit and crane interaction, according to at least one embodiment of the present disclosure.

FIG. 6 depicts an illustrative, non-limiting example diagram 600 of a box unit and crane interaction, according to at least one embodiment of the present disclosure.

In various embodiments, crane 602 has a magnetic element that can be attached to box unit 604 via the magnetic pick 606 located at the top side of the box unit 604. In various embodiments, the magnetic pick 606 and electronic comms 608 protrude upward from the top side of the box unit 604 and the bottom side of the box unit 604 has corresponding indentations that allow for boxes to be stacked on top of each other. In various embodiments, on the bottom of a box unit, the corners have box charging/box comms 610 that can be used for mechanical engagement, charging, module communication, or various combinations thereof. The top side of the box unit may have corresponding holes for receiving the box charging/box comms.

FIG. 7 shows an illustrative example of a process 700 for preparing a modular container for delivery, in accordance with one or more example embodiments of the present disclosure. In at least one embodiment, some or all of the process 700 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 700 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 700 may be implemented in the context of various systems and methods described elsewhere in this disclosure, such as those discussed in connection with FIGS. 1-6.

In various embodiments, process 700 comprises a step 702 to determine delivery order is created. The delivery order may be provided to the system performing process 700 by a cloud service. In some embodiments, the system can be viewed as including the modular container, box units, vehicle, packing facilities, cloud service, or any combination thereof.

In various embodiments, process 700 comprises a step 704 to determine that packages are retrieved from storage facility. In some embodiments, the packages may be retrieved from the storage facility by an employee or facility worker. The system performing process 700 may, in some cases, determine that the package has been retrieved when a worker scans a label, bar code, or other identifier on the package when it is retrieved. In some embodiments, the package is retrieve by autonomous robots in a storage facility.

In various embodiments, process 700 comprises a step 706 to determine the packages are aligned with their corresponding boxes. In various embodiments, packages are assigned to respective box units. In various embodiments, some or all box units have an integrated display which can be configured to display information regarding the package that should be loaded into the box unit. In some embodiments, packages are configured to emit RF signals that can be detected by the box unit and used to identify when a package is properly aligned with its corresponding box unit. RF signals may include identification information, may be used to determine an absolute or relative location of the package, etc.

In various embodiments, process 700 comprises a step 708 to load the package to the box unit. In various embodiments, package information is loaded onto circuitry of the box unit, for example, shipping information regarding the package such as the intended recipient, delivery location, and so on and so forth. In various embodiments, a LED on the box unit will emit a green signal or other indicator of the state of the box unit. This step may be performed for each of the packages that were retrieved in step 704.

In various embodiments, process 700 comprises a step 710 to load the packages into a tray approximately according to a delivery route. The delivery route may be determined based on various factors, such as the available space within the platform chassis, the delivery location for other packages that are to be loaded and delivered on a route, and more.

In various embodiments, process 700 comprises a step 712 to load the loading tray into the modular container. The loading tray may be ordered as described above.

In various embodiments, process 700 comprises a step 714 to determine a delivery route. In various embodiments, the delivery route is determined based on an optimization to deliver the most packages in the least amount of time, or other factors, such as convenience to customers. In some embodiments, delivery locations may be determined to allow for multiple deliveries to be made at the same location. For example, if there are several customers located in close physical proximity (e.g., in a dense urban environment), the delivery location may be determined at a location convenience to the several customers, for example, by calculating a centroid, incenter, or orthocenter based on the locations of the customers so that a common delivery location does not unduly inconvenience any customers.

In various embodiments, process 700 comprises a step 716 to upload the delivery route to the cloud. In various embodiments, delivery vehicles are cloud connected and a cloud service is able to coordinate deliveries among a fleet of delivery trucks. In various embodiments, different delivery trucks are able to be loaded with modular containers. Deliveries trucks may have different vehicular properties, such as power, range, etc. that the cloud service may use to determine an optimal allocation of the fleet. In various embodiments, the route is uploaded to the cloud and then prepared to be loaded to a delivery vehicle.

In various embodiments, process 700 comprises a step 718 to load the route into the modular container system. In various embodiments, the route is loaded into the vehicle by a cloud service. In various embodiments, process 700 comprises a step 720 to prepare modular container for loading into the delivery vehicle.

In various embodiments, process 700 comprises a step 722 to determine that the modular container is ready to leave the storage facility. The status of the modular container may be communicated to the cloud service, for example, to indicate that the modular container has been attached to a specific vehicle and that the vehicle has been assigned the corresponding route for delivery of the packages in the attached modular container.

Figure 8:
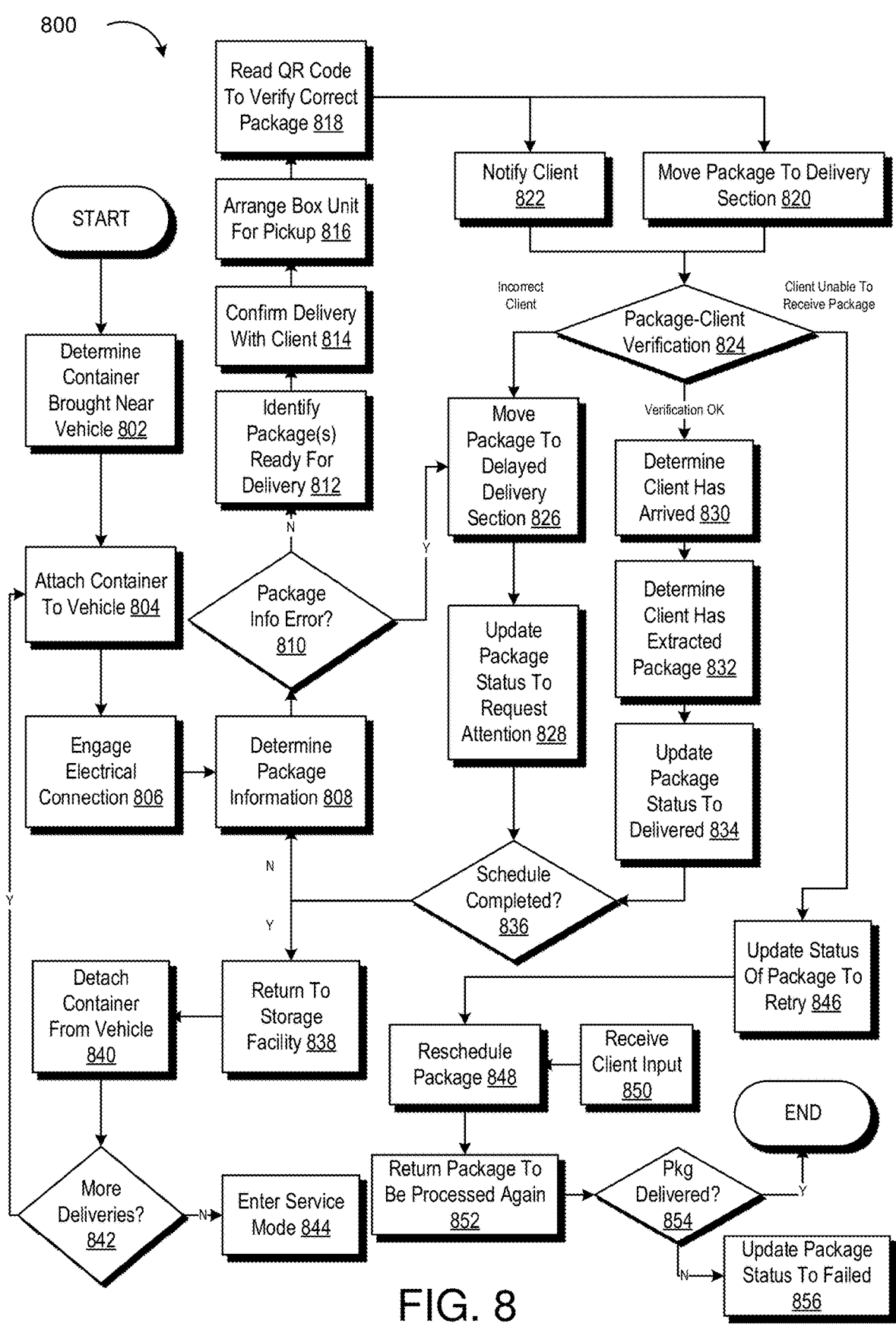
FIG. 8 shows an illustrative example of a process for performing a contactless delivery using a modular container delivery system, in accordance with one or more example embodiments of the present disclosure.

FIG. 8 shows an illustrative example of a process 800 for performing a contactless delivery using a modular container delivery system, in accordance with one or more example embodiments of the present disclosure. In at least one embodiment, some or all of the process 800 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 800 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 800 may be implemented in the context of various systems and methods described elsewhere in this disclosure, such as those discussed in connection with FIGS. 1-6.

In various embodiments, process 800 comprises a step 802 to determine that the modular container has been brought near a vehicle. In various embodiments, the container is loaded with modular box units that are ordered according to an approximate delivery route.

In various embodiments, process 800 comprises a step 804 to attach the modular container to the vehicle. In various embodiments, the vehicle has a chassis platform. In various embodiments, the modular container and the platform chassis have a special connection interface for both mechanical engagement and module communication.

In various embodiments, process 800 comprises a step 806 to engage electrical connection between the modular container and the vehicle. The electrical connection may be used by the modular container to deliver extra information for the vehicle platform, such as extra cameras and sensors. In various embodiments, the modular containers can charge the driving platform so that the platform has less charging downtime and more workable hours.

In various embodiments, process 800 comprises a step 808 to determine package information. In various embodiments, when the vehicle is on route, the package sorter (integrated system) is used to determine package information and relay such information to the vehicle.

In various embodiments, process 800 comprises a step 810 to determine whether the package information indicates an error. If the package information is okay, then process 800 may proceed to step 812. Otherwise, if the package returns an error the process 800 may proceed to step 826.

Continuing with FIG. 8, in various embodiments, process 800 comprises a step 812 to determine which packages are to be delivered soon. In various embodiments, this step involves determining the location of the vehicle, route information for the vehicle, delivery locations for packages that are loaded in the modular container, and to estimate when delivery of various packages are expected based on such conditions.

In various embodiments, process 800 comprises a step 814 to notify client that delivery vehicle is nearby to confirm delivery. In various embodiments, the vehicle is in communication with a cloud service provider and provides the cloud service provider with updates on its location (e.g., GPS coordinates) and the cloud provider may send a notification to the client or customer, for example, via an electronic message such as e-mail or a text message or mobile app notification. The notification may indicate that the package is on route and provide an estimated delivery time and/or location.

In various embodiments, process 800 comprises a step 816 to arrange box unit of package to position them to be easy to reach for the delivery process. In various embodiments, the box units within a modular container are approximately organized according to a route. For example, a last-minute package for delivery may be placed on top of other box units such that it is out-of-sequence. In various embodiments, the modular container has a crane with a magnetic element that can be attached to and detached from the box units. The magnetic arm of the modular container may be used to organize the box units in the modular unit so that they are on top of other boxes, meaning that the retrieval of such box units can be performed quickly as other box units do not need to be moved when the client requests the package.

In various embodiments, process 800 comprises a step 818 to read a QR code to verify the correct package. This may be performed prior to the vehicle arriving at the delivery destination to ensure that the correct packages have been picked up.

In various embodiments, process 800 comprises a step 820 to move package to delivery section. In various embodiments, a package sorter of the vehicle will move the package to be delivered from a storage section to a delivery section. This may be performed concurrently with the client being notified that the package is ready to be picked up.

In various embodiments, process 800 comprises a step 822 to notify client that the package is ready to be picked up. Various notification mechanisms, such as those discussed above, may be utilized to notify the customer, including e-mail or text messages, mobile app notifications, etc. This may be performed concurrently with the package sorter moving the package from the storage section to the delivery section.

In various embodiments, process 800 comprises a step 824 to perform package-client verification. In various embodiments, verification involves the customer scanning a QR code with a scanner of the vehicle located nearby a hatch, door, or other barrier element that can be controlled by the vehicle.

In various embodiments, if the package-client verification fails or the incorrect client information is presented, the process 800 may proceed to step 826. If the delivery verification is validated and OK, then the process 800 may proceed to step 830. If the client is unable to receive the package, the process 800 may proceed to step 846. In various embodiments, the customer is provided a time window in which the delivery can be made. If the client is unable to reach the vehicle before the time window or the vehicle departs, then the status of the package may be updated so that a subsequent delivery attempt may be made.

In various embodiments, process 800 comprises a step 826 to move the package to a separate section of the vehicle.

In various embodiments, the modular container has a dedicated section (e.g., separate from storage and delivery sections) where packages can be moved to be checked, or in a delayed delivery section.

In various embodiments, process 800 comprises a step 828 to cause the box unit's LED to indicate that attention is requested. In various embodiments, in response to a package return error or incorrect client, the box unit can be configured to emit a red LED visual indicator so that workers will be made aware that further attention is needed when the box unit is returned to the storage facility. In various embodiments, the process 800 will proceed to attempt delivery of the next package on the delivery route (e.g., returning to step 808).

In various embodiments, process 800 comprises a step 830 to determine that the client has arrived at the delivery vehicle. In various embodiments, the delivery vehicle is fully automated so that contactless delivery can be facilitated, reducing the possibility of transmission for infectious diseases that would otherwise be possible if a human driver were involved with the delivery. The client's location may be determined based on wireless signals emitted by a client's device, such as mobile phone, which can be used to determine absolute or relative position of the client. In various embodiments, the client scans a QR code with a QR code reader of the vehicle. In various embodiments, cameras or other sensors are used to determine when the client is ready to receive the contents of the box unit being delivered. In various embodiments, the delivery section has a door that will be programmatically opened when the client scans a QR code, enters a pin, or provides other information as part of a package-client validation process. In some embodiments, the client's biometrics may be used to validate that the correct recipient is present. In some embodiments, photo or video data is captured, which can be used to deter theft or provided for investigations into lost packages.

In various embodiments, process 800 comprises a step 832 to determine that the client has extracted the package from the delivery section. In various embodiments, a door or other physical barrier is opened, revealing a box unit whose contents includes the package that is to be delivered to the client. In some embodiments, a door or hatch of the box unit is unlocked as part of the delivery process to allow for the client to access the contents of the box unit.

In various embodiments, process 800 comprises a step 834 to update the status of the package to deliver. In various embodiments, this step involves instructing the box unit to turn its LED off. Status of the package may be transmitted to a cloud service, according to various embodiments of the present disclosure. Accordingly, the workflow for facilitating the delivery of a package using a modular container and box units is described herein.

In various embodiments, process 800 comprises a step 836 to determine whether the delivery schedule has been completed. If not, then the process 800 may return to step 808 and perform delivery for second, third, fourth, etc. packages until all packages on the route have been successfully delivered.

In various embodiments, process 800 comprises a step 838 to return to the storage facility if the delivery schedule has been completed. Completion of a route may involve the attempted delivery of some or all packages within the modular container. For example, in some cases, there may be unexpected traffic that causes part of a delivery route to be skipped, and those packages may be delivered at another time.

In various embodiments, process 800 comprises a step 840 to detach the modular container from the vehicle. In various embodiments, the vehicle has a chassis platform. In various embodiments, the modular container and the platform chassis have a special connection interface for mechanical disengagement. In various embodiments, process 800 comprises a step 842 to determine whether more deliveries are needed. If more deliveries are needed, a second modular container may be attached to the vehicle. In various embodiments, the second modular container can be loaded while the vehicle is on the delivery route. In various embodiments, the modular containers can charge the driving platform so that the platform has less charging downtime and more workable hours. This may allow for the vehicle to continuously operate. For example, a conventional BEV may have a finite battery life that limits the range of the delivery vehicle such that once the battery is depleted, the vehicle needs to be charged at a charging station. In various embodiments, the modular container acts as a primary or secondary power source for the vehicle such that the vehicle may operate continuously as modular containers that are swapped in can provide additional range to the vehicle.

In various embodiments, process 800 comprises a step 844 to enter service mode if no more deliveries are needed. Service mode may allow for the vehicle, modular containers, box units, or any other component to be serviced. For example, undelivered packages may be unloaded and then serviced by facility workers.

Returning to step 826, if the package-client verification is performed and the client is unable to receive the package, process 800 proceeds to step 846 to update the status of the box unit to retry status. In various embodiments, a blue LED signal is emitted to signify that a redelivery attempt should be made.

In various embodiments, process 800 comprises a step 848 to reschedule the package for another delivery attempt. In various embodiments, the status of the package is transmitted to a cloud service that coordinates the delivery of packages across an entire distribution network. In various embodiments, as part of rescheduling the package, the process 800 comprises a step 850 to receive client input with regards to a new delivery date and/or time to attempt a re-delivery.

In various embodiments, process 800 comprises a step 852 to return the package to be processed again. In various embodiments, the package is returned to the storage facility and may be unloaded from the modular container and re-processed and placed in another modular container for another delivery attempt. In various embodiments, the process 800 proceeds to delivery of the next package in the vehicle's delivery route. Process 800 may comprise a step 854 to determine whether the package is delivered. In some embodiments, at step 856 status of a package is put on a fail status if several attempted deliveries are unsuccessful. This may occur after the second, third, fourth, etc. delivery attempt. Once the delivery is deemed to have failed, the package status may change to failed, and the order may be canceled or redirected to the storage facility for in site delivery. If the package is delivered successfully, process 800 is completed, with respect to the delivered package.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communica-tions (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. How-ever, any subject matter resulting from a deliberate reference back to any previous claims (in particular multiple depen-dencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combi-nation of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementa-tions provides illustration and description, but is not intended to be exhaustive or to limit the scope of embodi-ments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data process-ing apparatus to produce a particular machine, such that the instructions that execute on the computer, processor, or other programmable data processing apparatus create means for implementing one or more functions specified in the flow diagram block or blocks. These computer program instruc-tions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may pro-vide for a computer program product, comprising a com-puter-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the com-puter or other programmable apparatus to produce a com-puter-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in lan-guage specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   attaching a modular container to a vehicle using a connection interface that provides for mechanical engagement and module communication, wherein the modular container is loaded with a plurality of box units and comprises a magnetic arm with an attachment mechanism for attaching to a magnetic pick of a box unit;
   determining, based on a delivery route, at least a first package in a first box unit that is ready for delivery;
   confirming delivery of the first package with a client;
   using the magnetic arm to arrange the first box unit for pickup;
   reading a QR code to verify the first package;
   performing a package-client verification;
   determining successful verification of the client;
   determining that the client has arrived at a delivery location;
   determining that the client has extracted the first package from the first box unit; and
   updating first package status of the first package to delivered.

2. The method of claim 1, further comprising
   determining an incorrect client as part of the package-client verification;
   moving the first package to a delayed delivery section of the modular container; and
   updating the first package status to request attention.

3. The method of claim 1, further comprising:
   determining the client is unable to receive the first package as part of the package-client verification;
   updating the first package status to retry delivery; and
   rescheduling delivery of the first package.

4. The method of claim 1, further comprising using the magnetic arm to move the first box unit from a storage section of the modular container to a delivery section of the modular container.

5. The method of claim 1, wherein the first box unit comprises:
   a first notification LED that reflects the first package status;
   a first magnetic pick for attachment with the magnetic arm; and
   first electronic comms.

6. The method of claim 5, wherein the first box unit further comprises a second magnetic pick located on a bottom of the first box unit for attachment with another box unit.

7. The method of claim 1, wherein the modular container comprises a verification unit for reading the QR code and a delivery interface for providing the client with access to the first package.

\*   \*   \*   \*   \*